United States Patent [19]

Mita et al.

[11] Patent Number: 4,503,470
[45] Date of Patent: Mar. 5, 1985

[54] TIME CODE GENERATOR

[75] Inventors: Michio Mita, Atsugi; Jun Takayama, Machida, both of Japan

[73] Assignee: Sony Corporation, Tokyo, Japan

[21] Appl. No.: 341,105

[22] Filed: Jan. 20, 1982

[30] Foreign Application Priority Data

Jan. 22, 1981 [JP] Japan .................................. 56-8206

[51] Int. Cl.³ ...................... H04N 5/782; G11B 27/00
[52] U.S. Cl. .................................. 360/33.1; 360/14.3; 360/38.1
[58] Field of Search ........................ 360/33.1, 26, 14.1, 360/14.2, 14.3, 38.1, 36.1, 36.2; 358/311, 314, 320, 337

[56] References Cited

U.S. PATENT DOCUMENTS 3,721,757  3/1973  Ettlinger .............................. 360/14.3
4,189,756  2/1980  Ninomiya ............................. 360/14.2
4,360,841  11/1982 Mita .................................. 360/14.3 X
4,363,048  12/1982 Tanaka et al. ....................... 360/14.2
4,394,694  7/1983  Ninomiya et al. .................... 360/14.3

Primary Examiner—D. McElheny
Attorney, Agent, or Firm—Hill, Van Santen, Steadman & Simpson

[57] ABSTRACT

A time code generator having a time code generating circuit for generating a first time code signal in response to a vertical synchronizing signal, a memory for storing a second time code signal reproduced from a VTR, a circuit for comparing the first time code signal with the second time code signal to produce an inconformity signal, a counter for counting the inconformity signal and a circuit for loading the second time code signal to the time code generating circuit according to an output of the counter.

4 Claims, 3 Drawing Figures

TIME CODE GENERATOR

BACKGROUND OF THE INVENTION

1. Field of the Invention

This invention relates generally to a time code generator and is directed more particularly to a time code generator which includes an error correcting circuit.

2. Description of the Prior Art

When a video signal is recorded by using a VTR (Video Tape Recorder), it is general that a time code signal for indicating an absolute time of the video signal is simultaneously recorded together with the video signal.

As the time code thus described, an SMPTE (Society of Motion Picture and Television Engineers) time code and an EBU (European Broadcasting Union) time code are respectively normalized for NTSC (National Television Systems Committee) and CCIR (International Radio Consultative Committee). This time code signal is formed of a binary signal for showing an hour, a minute, a second and a frame number thereof in every frame of the video signal, which is used, for example, as an address signal upon electronic edition of a tape.

It is normal that in many cases, the time code to be recorded employs a real time when the VTR is in the recording mode, but, in this case, such a drawback is brought about that the time code is made discontinuous at the place the recording is interrupted.

On the other hand, a time code generator having a function what is called as JAM SYNC has been proposed and according to this time code generator, it is possible that after the recording is interrupted the time code is recorded by a kind of extrapolations as the time code being successive to the preceding time code. However, in a conventional time code generator, if a dropout will occur in the time code signal, its successiveness is broken and becomes unstable, or the circuitry thereof becomes complicated and hence the time code generator is expensive.

To notice the fact that the tape of the VTR is transported at the normal speed when the time code generator is operated in the JAM SYNC mode, the inventors of this invention succeeded in making a time code generator which is simple in construction and which can operate reliably or positively.

FIG. 1A diagrammatically shows a pattern of a time code signal portion recorded on the tape of the VTR in which a letter E represents an end of the recording. According to the JAM SYNC mode, if the recording is made after the end E, a time code such as 9, 10 ... is recorded following "8" as shown in FIG. 1A. Therefore, it becomes necessary to provide the time code generator to produce such signal. To realize this, the tape is switched to the reproducing mode after the tape is rewound by a little amount beyond the aforesaid end or position E, and the content of the time code read out from the tape is made coincident with the output of the time code generator and thereafter, a time code which can increment at every frame is generated, so that a time code with a code pattern as seen in FIG. 1B can be produced. Accordingly, if the magnetic head for producing the time code is switched to the recording mode at the end or editing point E so as to record the time code thus produced, the successive time codes can be obtained (arrows seen in FIGS. 1A and 1B diagrammatically represent directions along which the signals are supplied).

But, in the practical operation, there may occur such a possibility that any dropout is caused in the reproduced time code and the reproduced time code is read out erroneously. Thus, it becomes necessary to cope with the above aspect. As the error correction method, such method is proposed by the same assignee of the present invention in which is disclosed U.S. Pat. No. 4,360,841. But, when the above method is used for the JAM SYNC, there is a defect that the circuitry is complicated and hence many parts are needed therefor.

Accordingly, noticing the fact that the tape of the VTR is transported at the normal speed in JAM SYNC mode and the time code read out therefrom must always be the same as the time code produced from the time code generator except a case when any dropout is caused, the inventors of the present invention developed a time code generator which is simple in construction and which can operate positively or reliably.

OBJECTS AND SUMMARY OF THE INVENTION

Accordingly, it is an object of this invention to provide a time code generator which can remove the aforedescribed defects inherent to the prior art.

It is another object of this invention to provide a time code generator which can operate positively or reliably with a simple construction.

According to an aspect of the present invention, there is provided a time code generator having a time code generating circuit for generating a first time code signal in response to a vertical synchronizing signal, a memory for storing a second time code signal reproduced from a VTR, a circuit for comparing the first time code signal with the second time code signal to produce an inconformity signal, a counter for counting the inconformity signal and a circuit for loading the second time code signal to the time code generating circuit according to an output of the counter.

The other objects, features and advantages of the present invention will become apparent from the following description taken in conjunction with the accompanying drawings through which the like references designate the same elements and parts.

DESCRIPTION OF THE PREFERRED EMBODIMENT

Now, one embodiment of the time code generator according to the present invention will hereinafter be described with reference to FIG. 2.

Figure 2:
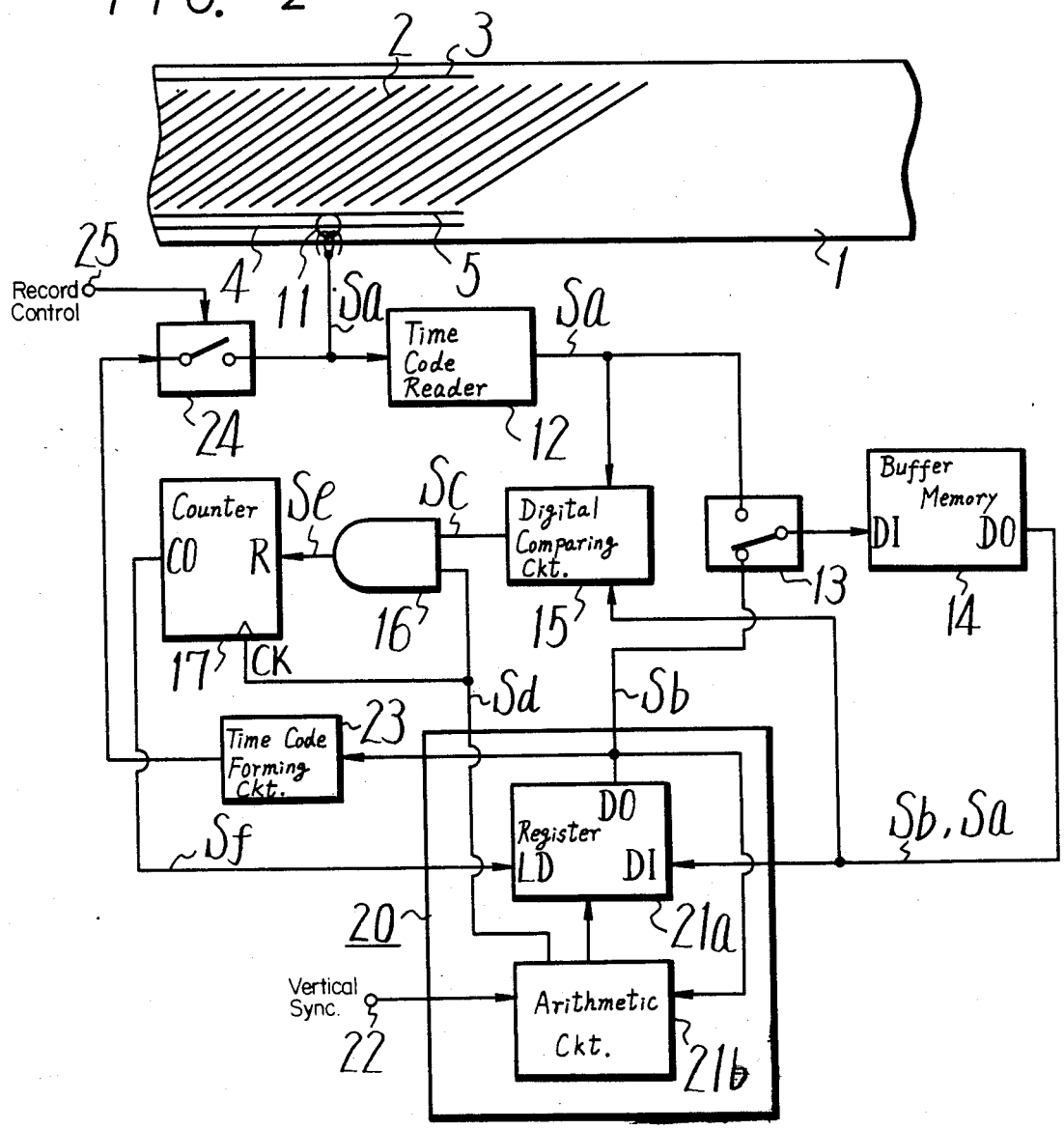
FIG. 2 is a systematic diagram showing one example of the time code generator according to the present invention.

FIG. 2 is a circuit diagram useful for showing the operation of the time code generator of the invention in the JAM SYNC mode.

In FIG. 2, reference numeral 1 designates a magnetic tape of a VTR (not shown), 2 a video track, 3 a control track, 4 an audio track and 5 designates an auxiliary track. On this track 5 is recorded a time code signal Sa. This time code signal Sa is reproduced by a magnetic head 11 and is read out by a time code reader 12. In this case, the magnetic head 11 is used not only to reproduce the time code signal Sa, but also to record the time code signal Sa, as will be described later.

Reference numeral 20 generally denotes a time code generating circuit being comprised of a register 21a and an arithmetic circuit 21b. This circuit 20 is so arranged that the arithmetic circuit 21b carries out the increment for a time code output Sb delivered from an output DO of the register 21a at every frame in response to a vertical synchronizing signal being applied thereto through a terminal 22, which incremented signal is then supplied to the register 21a. The aforesaid arrangement is substantially the same as the conventional time code generating circuit.

Numeral 13 represents a switching circuit for alternately producing the signals Sa and Sb within one frame period, which is adapted to be changed as shown in the figure only when, for example, the time code reader 12 reads out the sync word from the time code. Numeral 14 represents a buffer memory for memorizing the output from the switching circuit 13, 15 a digital comparing circuit or comparator and numeral 17 represents a quaternary counter. The comparator 15 is so formed that when its inputs to be compared are same, it makes its output Sc "1" during the same period. Also, upon increment, from the generator 20 is taken out a pulse signal Sd.

The signal Sb derived from the register 21a is written in the buffer memory 14 by way of the switching circuit 13 and next, this signal Sb is read out from the buffer memory 14 and then supplied to the comparator 15, to which the signal Sa produced from the time code reader 12 is also supplied, so that both the signals Sa and Sb are compared with each other.

Since both of the signals Sa and Sb are the same ones when the time code signal Sa is reproduced correctly, the compared output Sc from the comparator 15 turns "1". This signal Sc is delivered to an AND circuit 16 and in addition, the increment signal Sd with the frame period is supplied from the arithmetic circuit 21b to the AND circuit 16 and the AND circuit 16 produces an output signal Se which becomes "1" at the timing of the signal Sd, which is delivered to the counter 17 as a reset input. As long as the time code signal Sa is reproduced correctly, the operations as described above are repeatedly performed in every frame and hence, upon stationary state, the signal Sb same as the time code signal Sa is taken out from the terminal DO of the register 21a.

On the other hand, if the time code signal Sa to be reproduced contains a dropout, since the signal Sa is not coincided with the signal Sb, thus, Sc="0" and since Se="0", the counter 17 is not reset. At this time, the signal Sd is supplied to the counter 17 as the count input, so that the count value of the counter 17 becomes "1".

During the next frame period, the signals Sa and Sb are compared with one other again by the comparing circuit or comparator 15. But, assuming that the signal Sa is recovered from the dropout, since Sa=Sb in this frame period and hence Sc="1" and Se"1", the counter 17 is reset. Accordingly, when the dropout is caused in the signal Sa during only one frame period, owing to the arithmetic circuit 21b, the incremental property of the signal Sb is kept, which is delivered to the terminal DO of the register 21a. In other words, even if the signal Sa contains the dropout, such dropout is corrected and then delivered.

Likewise, if the dropout is the one up to three frame periods (three times), such dropout can be corrected.

Figure 1A:
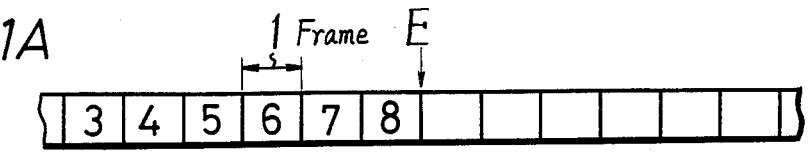
FIGS. 1A and 1B are diagrams used to explain the present invention.
Figure 1B:
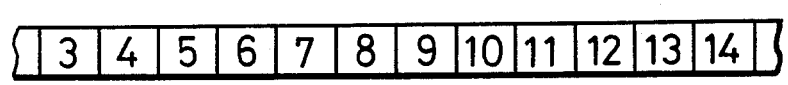

By the way, when the time code is recorded with the JAM SYNC mode, the tape 1 is rewound a little, for example, several seconds prior to the editing point E. To this reason, upon starting the edition of the tape 1, the VTR is started from the reproducing mode and the time code signal as well as the video and audio signals are reproduced by the magnetic head 11. Consequently, the output signal Sb from the time code generating circuit 20 and the output signal Sa reproduced by the magnetic head 11 and read out at the time code reader 12 come to have inconformity to each other in four frame periods or more. Accordingly, after four frame periods, the count value of the counter 17 is changed from "3" to "0" and at this time, from the counter 17 is produced a carry output signal Sf and this signal Sf is supplied to the register 21a as a load signal. At that time, the reproduced time code signal Sa derived from the time code reader 12 is written in the buffer memory 14 through the switching circuit 13 and the signal Sa read out from the buffer memory 14 is supplied to a terminal DI of the register 21a. Therefore, when the carry output signal Sf is achieved, the reproduced time code signal Sa is loaded to the register 21a, so that the content (signal Sb) of the register 21a is made coincident with the signal Sa. Thereafter, since the time code coincided with this time code signal Sa is incremented in turn by the arithmetic circuit 21b, the coincidence with the time code signal which is reproduced from the tape 1 can be achieved. The signal Sb derived from the terminal DO of the register 21a is supplied through a time code forming circuit 23 to a recording switch 24. This time code forming circuit 23 is provided for converting the time code signal Sb to the SMPTE time code. When the tape 1 arrives at the editing point or cue E, a recording signal from an editing machine (though not shown) is applied to the recording switch 24 through a terminal 25, by which a time code successive to the time code having been already recorded on the tape 1 as illustrated in FIG. 1B is recorded on the tape 1 by the magnetic head 11. In this case, upon recording, since the signal Sb is as it is supplied to the time code reader 12 as the signal Sa, the signals Sa and Sb are always made coincident one other. Therefore, it is possible to use the circuit same as the circuit upon reproducing.

Although it is arranged in the embodiment as set forth above that the signal Sb is changed to the signal Sa if the inconformity of the signal Sb to the signal Sa occurs four times in succession, another method may be taken by modifying the counter 17.

What is claimed is:

1. A time code generator for a tape recorder comprising time code generating means for generating a first time code signal incrementally in response to a synchronizing signal, a time code reader for reading a second time code signal reproduced from a tape recorder, comparator means connected to said generating means and to said reader for comparing said first time code signal with said second time code signal to produce an output signal representing an inconformity between said first and second time code signals, counting means connected to said comparator means and to said time code generating means for counting increments of said first time code signal in response to an output signal from said comparator means, and means connected to said counter and operative in response thereto for changing the output of said time code generating means to correspond to said second time code signal in response to an output of said counting means, whereby said first time code signal is periodically made equal to said second time code signal and maintained in synchronism with said second time code signal during periods between outputs of said counting means.

2. A time code generator for a tape recorder according to claim 1, wherein said time code generating means is comprised of a register and an arithmetic circuit for calculating an output from the register sequentially, and wherein said register output is supplied as the output of said time code generating means.

3. A time code generator for a tape recorder according to claim 1, further comprising means for selectively storing said first time code signal and said second time code signal, and for supplying said stored signal to said time code generating means.

4. A time code generator for a tape recorder according to claim 1, wherein said first time code signal is incremented in every frame period.

* * * * *